Patented Oct. 25, 1927.

1,646,785

UNITED STATES PATENT OFFICE.

WALTER DUISBERG, OF LEVERKUSEN, NEAR COLOGNE, AND WINFRID HENTRICH AND LUDWIG ZEH, OF WIESDORF, NEAR COLOGNE, GERMANY, ASSIGNORS TO GRASSELLI DYESTUFF CORPORATION, OF NEW YORK, N. Y., A CORPORATION OF DELAWARE.

ARYL ESTERS OF NITRO AMINO BENZENE SULPHONIC ACIDS.

No Drawing. Application filed June 9, 1925, Serial No. 36,042, and in Germany June 14, 1924.

Our invention resides in the hitherto unknown arylesters of nitro-aminobenzene sulphonic acids of the general formula

and in the process of producing these new compounds. In the above formula R stands for a radical of the benzene or naphthalene series in which one or more of the hydrogens of the benzene or naphthalene nucleus may be substituted by methyl, ethyl, carboxyl, or dialkylamino groups or halogen atoms, etc. R is, therefore, equivalent to $C_6H_5$, $C_6H_4$—$CH_3$, $C_6H_3(CH_3)_2$, $C_6H_4OCH_3$, $C_6H_4Cl$, $C_6H_4N(CH_3)_2$, $C_6H_4COOH$, $C_{10}H_7$, etc.

Our new process in the preferred embodiment comprises the following steps. A nitro-halogenobenzene sulphochloride is first condensed in alkaline solution with an equivalent amount of phenol or naphthol or a nuclear substitution product thereof, i. e., a hydroxy aryl compound, the aryl nucleus of which contains not more than ten carbon atoms:—

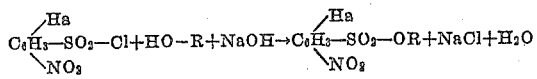

In this formula Ha stands for a halogen atom and R stands for a radical of the benzene or naphthalene series or a nuclear substitution product thereof. This reaction proceeds rapidly in aqueous medium at slightly elevated temperature. The phenolate or naphtholate reacts practically exclusively with the chlorine atom of the sulphochloride. The nitro-halogenobenzene sulphonic acid arylesters formed are then treated with aqueous or alcoholic ammonia at elevated and eventually super-atmospheric pressure whereby the halogen atom is replaced by the amino group.

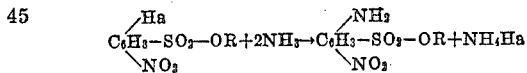

and the nitro-aminobenzene sulphonic acid arylester is formed. In the above formula Ha stands for a halogen atom and R stands for a radical of the benzene or naphthalene series or a nuclear substitution product thereof. Under these conditions the reaction is practically quantitative, no substantial amounts of the arylester being saponified.

The new nitro-aminobenzene sulphonic acid arylesters are usually slightly colored crystalline bodies, melting without decomposition. They are practically insoluble in water, but soluble in most organic solvents. They show the typical reactions of nitro and amino compounds. They are valuable intermediates for the production of dyestuffs.

The process as illustrated in the following examples can be varied within wide limits without departing from the spirit of our invention; optimum concentrations, times, temperatures, times of reaction, etc. depend on the individual properties of the ingredients and starting materials used. The parts given are by weight.

*Example 1.*—255 parts of 100% 4-nitro-1-chlorobenzene-2-sulphochloride are gradually introduced at 70–90° C. with violent stirring into a water solution of 116 parts sodium phenolate. The reaction is complete after about 1 hour's stirring, the solution shows then only a faint alkaline reaction. On cooling a yellowish-white oil separates completely. Dissolved in hot alcohol it is obtained on cooling as large colorless, prismatic crystals, melting at 92.5–93.5° C. (uncorrected). It is the 4-nitro-1-chlorobenzene-2-sulphonic acid phenylester, having most probably the formula

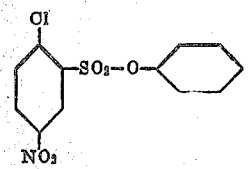

80 parts of this ester are suspended in 350 parts concentrated aqua ammonia and heated in an autoclave to 120–130° C. external temperature. The reaction is complete after from 2–3 hours' heating; the mass is evaporated to dryness, the ammonium chloride together with traces of nitro-aminobenzene sulphonate of ammonium are extracted with hot water. The residue consists of the 4-nitro-1-aminobenzene-2-sulphonic acid phenylester, having most probably the formula

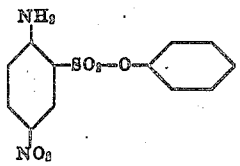

It is practically insoluble in water, but soluble in the usual organic solvents. It is obtained in a pure state by recrystallization from benzene as clusters of yellow needles melting at 112.5–113.5° C. (uncorrected). It shows the usual reactions of nitro and amino groups, as for instance reduction, reaction with acids to form salts, reaction with nitrous acid to form a diazo compound, etc.

*Example 2.*—255 parts of 2-nitro-1-chlorobenzene-4-sulphochloride are slowly added to a water solution of 130 parts sodium para cresolate, keeping the temperature at 70–90° C. The reaction proceeds rapidly; after completion the 2-nitro-1-chlorobenzene-4-sulphonic acid para-cresylester, having most probably the formula

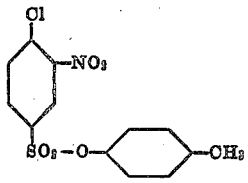

separates as a heavy oily substance. By recrystallization from alcohol it is obtained as colorless needles aggregated into clusters. It melts at 67–68° C. (uncorrected). 100 parts of this ester are suspended in 400 parts alcoholic ammonia and heated in an autoclave for several hours to 100–120° C. After completion of the reaction the solvent is distilled off and the residue extracted with hot water to eliminate the ammonium chloride formed. The 2-nitro-1-aminobenzene-4-cresylester.

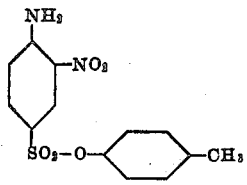

is obtained as brilliant yellow leaflets with a melting point of 138–139° C. (uncorrected). It is insoluble in water, soluble in the usual organic solvents. It reacts with nitrous acid to form a diazo compound and shows all the other characteristic reactions of an aromatic amino-body.

*Example 3.*—252 parts 4-nitro-1-chlorobenzene-2-sulphochloride are heated for several hours to 70–90° C. with an alkaline aqueous solution of 124 parts guaiacol. After cooling the 4-nitro-1-chlorobenzene-2-sulphonic acid 2′-methoxyphenyl ester separates as a fine crystalline powder. It melts at 83–84° C. (uncorrected) and has most probably the formula

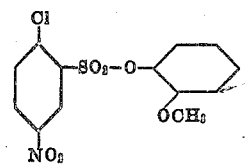

80 parts of this ester are treated for several hours in an autoclave with 320 parts concentrated aqua ammonia at an external temperature of 120–130° C. The reaction mass is evaporated to dryness and the remaining residue extracted with hot water. The so-obtained 4-nitro-1-aminobenzene-2-sulphonic acid o-methoxyphenylester

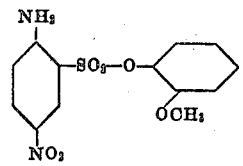

can be recrystallized from a benzene-petrolether mixture, it is then obtained as a yellow crystalline powder, melting at 133–134° C. (uncorrected). It is for all practical purposes insoluble in water but soluble in the usual organic solvents. It shows all the reactions inherent to compounds containing nitro and amino groups, such as reduction of the nitro group to an amino group, diazotization of the amino group, etc.

We claim:

1. In processes of producing nitro-aminobenzene sulphonic acid arylesters the steps comprising reacting in alkaline solution with a hydroxy-aryl compound, the aryl nucleus of which contains not more than ten carbon atoms upon a nitro-halogenobenzene sulphochloride to produce a nitro-halogenobenzene sulphonic acid arylester, reacting with ammonia upon such nitro-halogenobenzene sulphonic acid arylester to effect the replacement of the halogen by the amino group and recovering the nitro-aminobenzene sulphonic acid arylester formed.

2. In processes of producing nitro-aminobenzene sulphonic acid arylesters the steps comprising reacting in alkaline solution with a hydroxy-aryl compound, the aryl nucleus of which contains not more than ten carbon atoms upon a nitro-halogenobenzene sulphochloride to produce a nitro-halogeno sulphonic acid arylester, reacting with aqueous ammonia as superatmospheric pressure and elevated temperature upon such nitro-halogeno sulphonic acid arylester to effect the replacement of the halogen by an amino group and recovering the nitro-aminobenzene sulphonic acid arylester formed.

3. In processes of producing nitro-aminobenzene sulphonic acid phenylester compounds the steps comprising reacting with an alkali metal phenolate compound upon a nitro-halogeno sulphochloride to produce a nitro-halogeno benzene sulphonic acid phenylester compound, reacting with aqueous ammonia at superatmospheric pressure and elevated temperature upon such nitro-halogenobenzene sulphonic acid phenylester compound to effect replacement of the halogen by the amino group and recovering the nitro-aminobenzene sulphonic acid phenylester compound formed.

4. In processes of producing nitro-aminobenzene sulphonic acid phenylester compounds the steps comprising reacting with a sodium phenolate compound upon a nitro-chlorobenzene sulphochloride to produce a nitro-chlorobenzene sulphonic acid phenylester compound, reacting with ammonia upon such nitro-chlorobenzene sulphonic acid phenylester compound to effect the replacement of the chlorine by the amino group and recovering the nitro-aminobenzene sulphonic acid phenylester compound formed.

5. As new products nitro-aminobenzene sulphonic acid arylester compounds of the formula

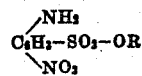

in which R stands for an aryl radical, the aryl nucleus of which contains not more than ten carbon atoms, which are slightly colored crystalline substances, melting undecomposed, and giving the typical reactions of aromatic primary amines.

6. As new products nitro-aminobenzene sulphonic acid phenylester compounds of the formula

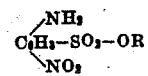

in which R stands for an aryl radical of the benzene series, which are yellow colored crystalline substances, melting undecomposed and giving the typical reactions of aromatic primary amines.

In testimony whereof we have hereunto set our hands.

WALTER DUISBERG.
WINFRID HENTRICH.
LUDWIG ZEH.